United States Patent [19]

Binder et al.

[11] 4,381,542
[45] Apr. 26, 1983

[54] SYSTEM FOR INTERRUPT ARBITRATION

[75] Inventors: Paul Binder, Tyngsboro; David A. Cane, Sudbury, both of Mass.

[73] Assignee: Digital Equipment Corporation, Maynard, Mass.

[21] Appl. No.: 198,528

[22] Filed: Oct. 20, 1980

[51] Int. Cl.³ .................................. G06F 3/04
[52] U.S. Cl. ........................................ 364/200
[58] Field of Search ... 364/200 MS File, 900 MS File

[56] References Cited

U.S. PATENT DOCUMENTS 3,815,099 6/1974 Cohen .................................. 364/200
3,836,889 9/1974 Kotok .................................. 364/200

OTHER PUBLICATIONS

Thurber, K., et al., "A Systematic Approach to the Design of Digital Bussing Structures", *Proceedings, Fall Joint Computer Conference,* 1972, pp. 719-740.

Primary Examiner—Raulfe B. Zache
Attorney, Agent, or Firm—Cesari and McKenna

[57] ABSTRACT

A data processing system in which a unit needing to be serviced by a processor first requests an interrupt and, after the interrupt is granted by the processor, requests access to a system bus to transfer interrupt information as it normally would transfer other information. The interrupting unit must wait for other units having higher priority to transfer information, usually memory information over the bus, before it can access the bus to transfer its interrupting information. This permits transfers of information having higher priority to occur before the transfer of the interrupt information is transferred.

8 Claims, 8 Drawing Figures

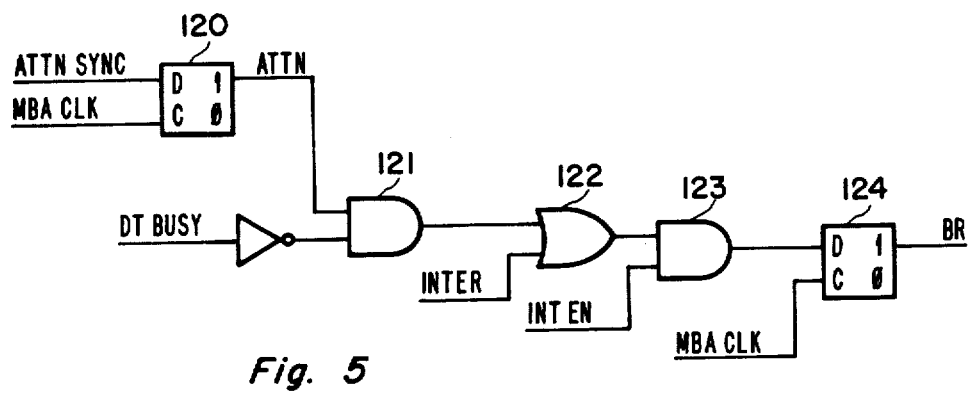
Fig. 5
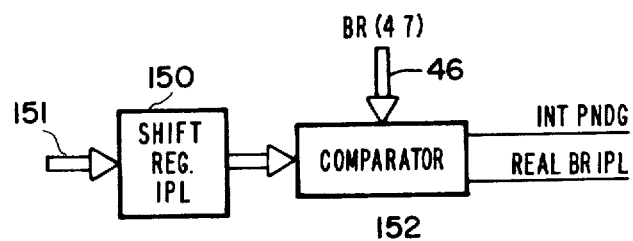
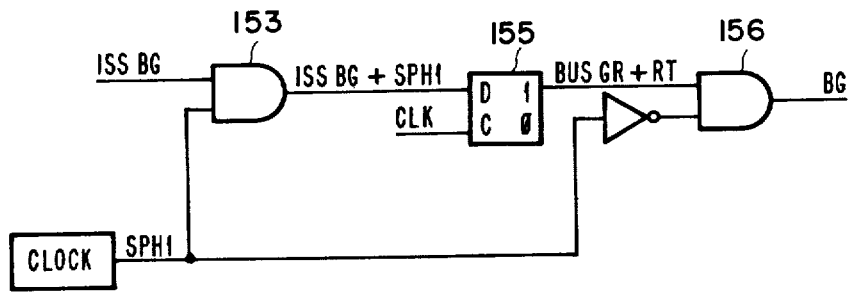
Fig. 6

SYSTEM FOR INTERRUPT ARBITRATION

CROSS REFERENCE TO RELATED U.S. PATENT APPLICATIONS

U.S. patent application Ser. No. 19,350 filed Mar. 12, 1979 in the name of Paul A. Binder et al and assigned to the assignee of the present invention, entitled Data Processing System.

U.S. patent application Ser. No. 19,351 filed Mar. 12, 1979 in the name of Paul A. Binder and assigned to the assignee of the present invention, entitled Data Processing System.

U.S. Pat. No. 4,232,366 in the name of John V. Levy et al and assigned to the assignee of the present invention, entitled Bus for a Data Processing System with Overlapped Sequences.

U.S. Pat. No. 4,229,791 in the name of John V. Levy et al and assigned to the assignee of the present invention, entitled Distributed Arbitration Circuitry for Data Processing Systems.

U.S. Pat. No. 3,815,099, issued June 4, 1974 and entitled Data Processing System.

U.S. Pat. No. 3,999,163, issued Mar. 23, 1976 and entitled Secondary Storage Facility for Data Processing System.

U.S. Pat. No. 3,710,324, issued Jan. 9, 1973 and entitled Data Processing System.

BACKGROUND OF THE INVENTION

1. Field of the Invention

This invention relates generally to the field of digital data processing systems, and more specifically to an improved arrangement by which a unit of the data processing system obtains access to the system bus to interrupt the processor of the data processing system.

2. Description of the Prior Art

A digital data processing system generally includes three basic elements: a memory element, an input/output element, and a processor element all interconnected by one or more buses. The memory element stores information in addressable storage locations. This information includes both data and instructions for processing the data. The processor element causes information to be transferred between it and the memory element, interprets the incoming information as either data or instructions, and processes the data in accordance with the instructions. An input/output element also communicates with the memory element in order to transfer information into the system and to obtain the processed information from it. The input/output elements normally operate in accordance with control information supplied to it by the processor element. The input/output elements may include operator consoles, printers or teletypewriters, or may also include secondary memory storage units such as disk drives or tape drives.

When an event occurs in the input/output element, or to a lesser degree the memory element, the element "interrupts" the processor element to permit it to ascertain the nature of the event and to perform such operations as may be necessitated by the event. For example, when the input/output element finishes processing control information previously supplied to it by the processor element, the input/output element may "interrupt" the processor element. The processor may then execute certain interrupt service routines required for the particular element. The input/output element may also interrupt the processor element to indicate that it is available for use, or to facilitate immediate recognition by the processor of special conditions or errors.

As a specific example of an interrupt, consider the operation of retrieving the contents of a certain track from a storage disk in a secondary memory storage unit such as the one disclosed in the aforementioned U.S. Pat. No. 3,999,163. The processor first must have the disk drive locate the track whose contents are to be retrieved, that is, the processor must have the disk drive move the head to the desired track. To do this, it loads address information into certain address registers, in particular the Desired Track Sector Register and Desired Cylinder Address Register, in the drive through the drive's controller. The processor also loads a search command in the Function portion of a Control and Status Register and sets a Go bit. The drive then moves the read/write head to the desired track.

When the drive locates the desired track identified by the address registers, the drive transmits an ATTN attention signal to its controller, which then transmits an interrupt request signal to the processor. The processor, if it is in condition to be interrupted, may then transmit a signal to the controller granting the interrupt. Typically, a processor will not transmit an interrupt grant signal if it is currently executing an instruction, and it typically waits until the end of the execution cycle of the instruction before granting the interrupt. Some processors, such as the VAX 11/780 processor sold by Digital Equipment Corporation, determine an interrupt priority level (IPL) based on the operating status of the processor. The interrupt requests from the various units of the system are assigned to certain interrupt levels, and if the request has a higher level than the processor's current interrupt priority level, the interrupt grant signal will be transmitted.

At this point, the processor may not know which unit is requesting the interrupt or the location in memory of the interrupt service routine for the unit. This may be the case if the interrupt request signal does not uniquely identify the unit requesting the interrupt or the location of the interrupt service routine. The processor then must be apprised of the location in memory of the interrupt service routine to permit it to service the interrupt.

After the interrupting unit receives a interrupt grant signal from the processor granting the interrupt, it can transfer a "vector" to the processor, as is done in the PDP-11 systems sold by Digital Equipment Corporation. The "vector" is the address in memory of the beginning of the interrupt service routine.

Returning to the foregoing example of the transfer from the disk drive, when the processor starts executing the interrupt service routine, it may transmit a command to the disk drive to read the contents of the located track into a particular portion of the memory element. In processing the interrupt service routine, the processor loads registers in disk controller with the address in memory to which the track contents are to be transferred and identifying the number of words to be transferred. The processor also loads the control and status register in the drive with a transfer command and sets a "GO" bit. The drive, under the control of the controller, then reads the contents of the track and transfers them to the controller, which transfers them to the location in memory specified by the processor. After it has transferred the number of words requested by the processor, the controller can stop the transfer.

After the transfer is complete, the drive, through the controller, can again interrupt the processor so that it may verify that the transfer has been completed without error, or if any errors occurred, to permit the errors to be corrected.

SUMMARY

It is an object of the invention to provide a data processing system including a new and improved arbitration arrangement involving processor interrupts.

In brief summary, the invention includes a data processing system comprising a processor, a memory unit, and several input/output units, all interconnected by a common system bus. Each unit connected to the bus has a pre-assigned priority. If a unit needs to transfer information over the system bus, it first obtains control of the bus by means of an arbitration operation. The system bus also includes signal paths over which the units request interrupts and receive the interrupt grants from the processor. When a unit requires an interrupt, it requests the interrupt by energizing the interrupt request signal path, and the processor grants the interrupt by energizing the appropriate interrupt grant signal path. After the interrupt is granted, the interrupting unit energizes an interrupt grant acknowledge line of the system bus which indicates that the unit which has been granted the interrupt still requires the interrupt. The interrupting unit then performs an arbitration operation on the system bus along with other units that may need to make transfers thereover. Until the interrupting unit has control of the system bus, other units with higher priorities can control the system bus to make transfers thereover and thereby block the transfer of the interrupt vector from the interrupting unit to the processor. When the interrupting unit gets control of the system bus, it transfers the interrupt vector and then de-energizes the interrupt grant acknowledge line.

The invention is pointed out with particularity in the appended claims. The above and further objects and advantages of the invention may be better understood by referring to the following description taken in conjunction with the accompanying drawings.

BRIEF DESCRIPTION OF THE DRAWINGS

FIG. 5 is a schematic diagram showing a circuit according to the invention for generating an interrupt request signal;

FIG. 6 is a schematic diagram of a circuit according to the invention for generating an interrupt grant signal;

DETAILED DESCRIPTION OF AN ILLUSTRATIVE EMBODIMENT

Figure 1:
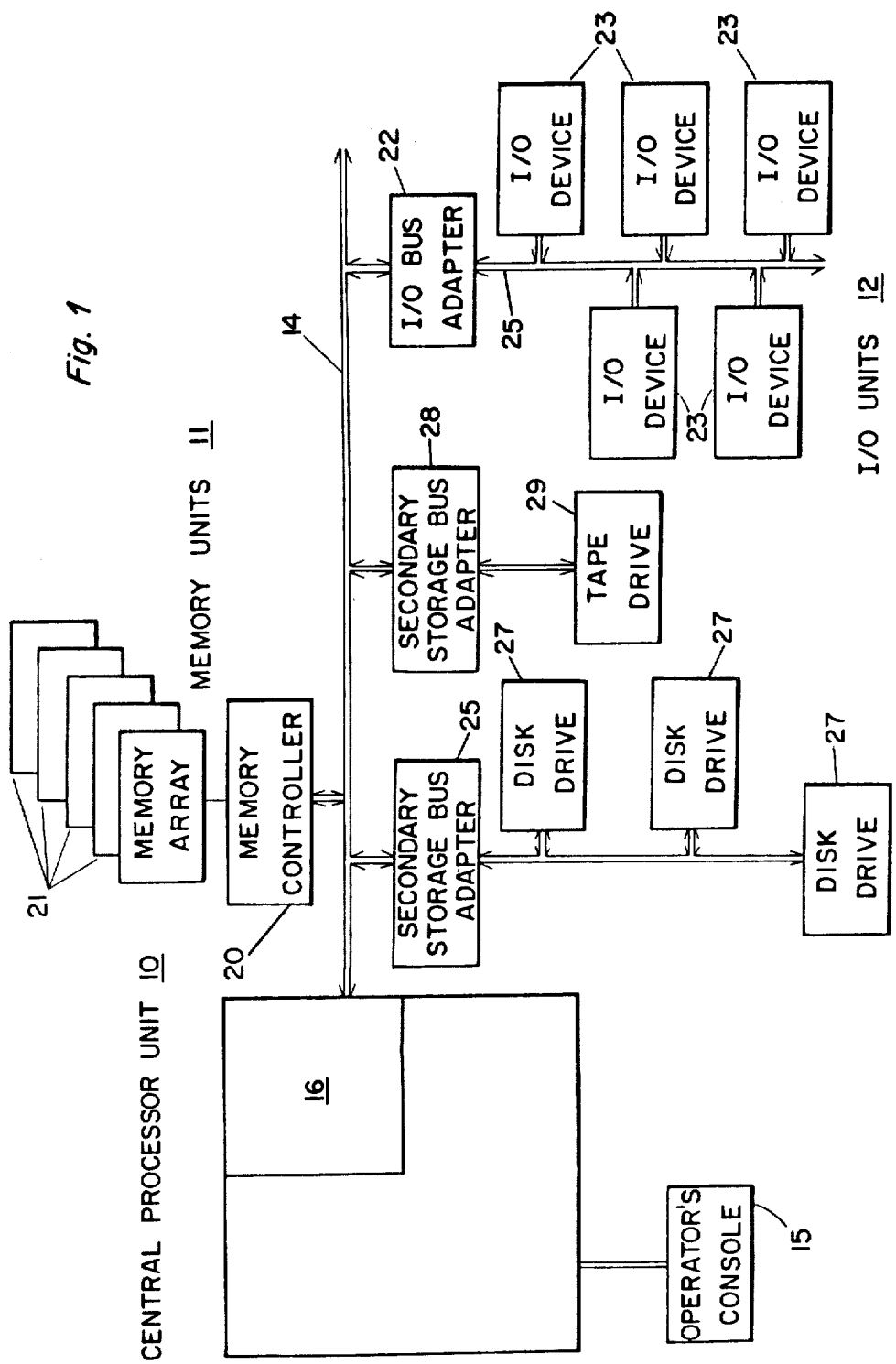
FIG. 1 is a block diagram of a digital data processing system constructed in accordance with this invention.

As exemplified in FIG. 1, the basic elements of a data processing system according to the invention include a central processor unit 10, memory units 11 and input/output (I/O) units 12. Input/output units 12 may include one or more secondary memory storage units 13. Central processor unit 10, memory units 11 and input/output units 12 are all interconnected by a system bus 14.

The central processor unit 10 may include an operator's console 15, a bus interface 16 and other conventional circuits normally provided in the central processor unit. The bus interface 16 receives all information and performs all transactions with system bus 14 for the other circuitry in central processor unit 10.

The operator's console 15 serves as the operator interface. It allows the operator to examine and deposit data, halt the operation of the central processor unit 10, or step the central processor unit through a sequence of program instructions. It also enables an operator to initialize the system through a bootstrap procedure and perform various diagnostic tests on the entire data processing system.

The memory unit 11 includes a memory controller 20 which connects to a plurality of memory arrays 21. Each memory array contains addressable storage locations and the controller 20 includes circuitry for obtaining access to a particular storage location specified by the processor or any other element attempting to make a transfer with the memory unit 11. The controller 20 also includes circuitry for retrieving the contents of an addressed location, and for storing information therein. The operation of memory unit 11 in one specific embodiment of the invention is similar to that disclosed in U.S. Pat. No. 4,232,366, issued Nov. 4, 1980, to John V. Levy et al and assigned to the assignee of this application.

Several types of input/output units 12 are shown. An input/output bus adapter 22 connects several input/output devices 23, such as, for example, printers or video display terminals, to bus 14. The input/output devices 23 are connected to input/output bus adapter 22 through an input/output bus 25, which in one specific embodiment of this invention is described in U.S. Pat. No. 3,710,324.

The secondary memory storage units 13 may include a secondary storage bus adapter 26, and a plurality of disk drives 27. Furthermore, another secondary storage bus adapter 28 may connect to one or more tape drives 29. The interconnection of the secondary storage bus adapters 26 and 28 to the respective disk drives 27 and tape drive 29, in one specific embodiment, is disclosed in U.S. Pat. No. 3,999,163, with the secondary storage bus adapters 26 and 28 constituting the controllers for the disk drives 27 and tape drive 29, respectively.

Bus 14 interconnects various units or elements of the data processing system. Prior to describing the transfer of information between different pairs of the units connected to bus 14, it will be helpful first to establish some definitions for terms that have already been used and that will be used throughout the remainder of this command description.

"Command" relates to transfers over bus 14, and indicates the direction in which information is to be transferred thereover. A "command" is typically accompanied by an "address" which indicates the location to which or from which the information is to be transferred.

"Information" is intelligence used to control and provide the basis for data processing. It includes data, instructions, and status information.

"Data" is information which is the object of or the result of processing.

"Control information" is data which may be used to control certain operations of units of the data processing system.

An "instruction" is information which indicates to the processor how the data is to be processed by the processor.

"Status information" as related to a transfer over the bus 14, refers to the status of the transferred information, and primarily to data that is transferred. The status information indicates whether the transferred information contained no errors, whether it was corrected information, uncorrectable information, or whether no response was obtained from the other element involved in the transfer.

Each element that connects directly to bus 14 is called a nexus. The specific system shown in FIG. 1 includes the following five nexuses: bus interface 16, memory controller 20, input/output bus adapter 22 and secondary storage bus adapters 26 and 28. The nexuses are further distinguished in terms of their functions during an exchange of information. During such an exchange, the nexus that transmits the command and address is called a master nexus 40A shown in FIG. 2. The unit which responds to the command and address is called a slave nexus 40B.

Two nexuses transfer information over bus 14 by means of a "bus transaction" after the master nexus has control of the bus. During the bus transaction, the master nexus first transmits the command and address onto bus 14. Each nexus receives the command and address and examines the address to determine whether it is addressed. The nexus identified by the address then prepares to complete the information exchange. The information to be exchanged passes between the master nexus and the slave nexus over bus 14 and the slave nexus also transfers status information to the master nexus.

There are two basic types of operations that can be performed in connection with an information transfer over bus 14, as determined by the direction of transfer between the master nexus and slave nexus. In an operation in which information is transferred by the master nexus to slave nexus, a WRITE transaction, the information is transferred immediately after the command and address have been transferred. However, in performing an operation in which information is transferred to the master nexus by the slave nexus, a READ transaction, the slave nexus may take some time to retrieve the information identified by the address prior to transferring it. The slave nexus prevents other nexuses from having access to the bus 14 until it has retrieved the information and transferred it to the master nexus.

Thus, if a central processor unit 10 needs to retrieve data from memory unit 11, the central processor unit first obtains control of bus 14 to become the master nexus 40A. It transmits a READ command and the address of the location being read. All of the other nexuses on bus 14 receive and decode the command and address, and memory controller 20 identifies itself as the unit identified by the address. Memory controller 20 thus becomes slave nexus 40B. The memory controller 20 retrieves the information from the storage location identified in the address, simultaneously preventing other nexuses from taking control of the bus. Then, the memory controller 20 transfers the information to the master nexus 40A, and also returns status information to the master nexus. The bus is thereafter available to other nexuses for an information transfer. Locations in any of the nexuses can be read in the same way.

In addition to the WRITE and READ transactions, a master nexus that is not the central processor unit 10 can perform a WRITE VECTOR transaction. In a WRITE VECTOR transaction, the information transferred constitutes an interrupt vector that identifies the location in memory of the beginning of an interrupt service routine by which the processor can service the interrupt.

Figure 2:
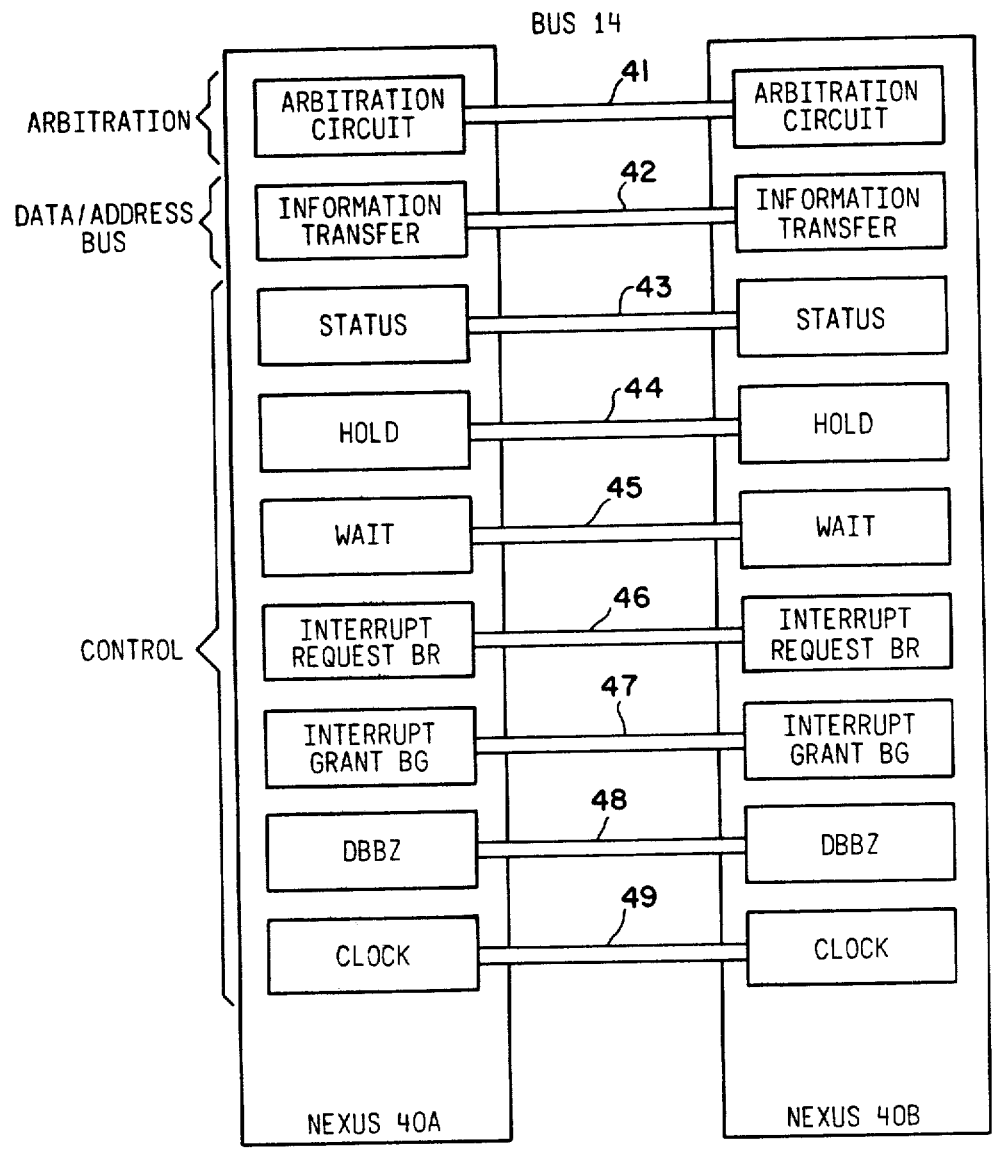
FIG. 2 is a block diagram illustrating a portion of the data processing system of FIG. 1, detailing the signal transfer lines and the corresponding signals that constitute the system bus interconnecting the nexuses.

In accordance with one specific embodiment of this invention, the bus 14 conveys a number of signals to and from the various units that connect to it over corresponding conductors. As shown in FIG. 2, these conductors and signals can be divided into three general classes:

1. arbitration, over arbitration bus 41;
2. command/address and information transfer, over the data/address bus 42; and
3. bus control, over control bus conductors 43–49.

Conductors 41–49 comprise bus 14.

Arbitration bus 41 is used to determine which of the nexuses connected to the bus will become the master nexus to initiate a bus transaction over bus 14. In one specific embodiment, an arbitration arrangement is used that is similar to that disclosed in U.S. Pat. No. 4,229,791 issued Oct. 21, 1980, to John V. Levy, et al, and assigned to the assignee of this invention. Arbitration bus 41 consists of a plurality of conductors, each corresponding to a predetermined priority. Each nexus is connected to one conductor of the arbitration bus 41 that corresponds to its preselected priority. Each nexus is also connected to all of the arbitration bus conductors having a higher priority. When a nexus wants to become the bus master to initiate a bus transaction, it energizes its conductor of the arbitration bus 41 and notes whether the arbitration conductors having higher priority are energized. If any other nexus also desires to make a transfer it also energizes its conductor of the arbitration bus. If a higher priority nexus energizes its conductor of the arbitration bus, the lower-priority nexuses are prevented from making a transfer on system bus 14.

The data/address bus 42 in one specific embodiment transfers both a command and address during an initial part of a bus transaction and information during a later part of a bus transaction, all over the same conductors.

The control portion of bus 14 includes status conductors 43 which carry the status information contemporaneously with the transfer of the information to which the status relates.

A HOLD conductor 44 carries a HOLD signal. Any nexus may assert a HOLD signal, which, while asserted, prevents any other nexus from gaining control of bus 14.

A WAIT conductor 45 carries a WAIT signal which, when asserted, indicates that an interrupt operation is pending.

The BR interrupt request conductors 46 include four conductors indicative of differing interrupt priority. Any unit in the data processing system shown in FIG. 1 which may have to interrupt the central processing unit 10 must be connected to one of the four BR interrupt request conductors 50. When a unit of the data processing system requires an interrupt, it energizes the BR interrupt request conductor to which it is connected.

The four BG conductors 47 carry the BG bus grant signals. The BG interrupt grant conductors each correspond to a BR bus request line. When the central processing unit 10 grants an interrupt, the BG interrupt grant conductor is energized that corresponds to the BR interrupt request conductor that had the highest priority that was asserted.

The DBBZ data/address bus busy conductor 46, carries a DBBZ data address bus busy signal. The DBBZ signal is asserted by the master nexus 40A after it has arbitrated and has control of the bus 14, and while it transfers the command and address. If the slave nexus is to transfer information back to the master nexus, it thereafter asserts the DBBZ data address bus busy signal until it transfers the information. The DBBZ signal, when asserted, prevents any other nexus from arbitrating to take control of the bus 14, although the other nexuses may energize their arbitration conductor.

The CLOCK conductor 47 carries CLOCK timing signals by which the respective nexuses synchronize the various signals on bus 14. The nexuses may also use the timing signals from clock conductor 47 to control various internal functions.

Figure 3:
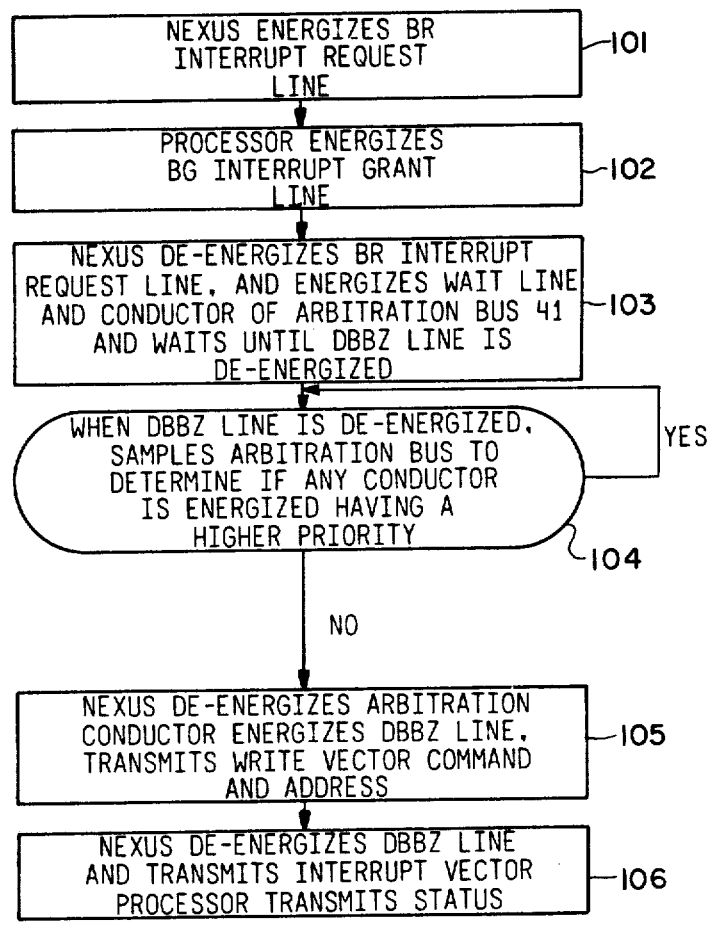
FIG. 3 is a flow diagram depicting the sequence by which a unit of the data processing system requests and is granted an interrupt from the processor, obtains control of the system bus and transfers the interrupt vector to the processor.
Figure 4:
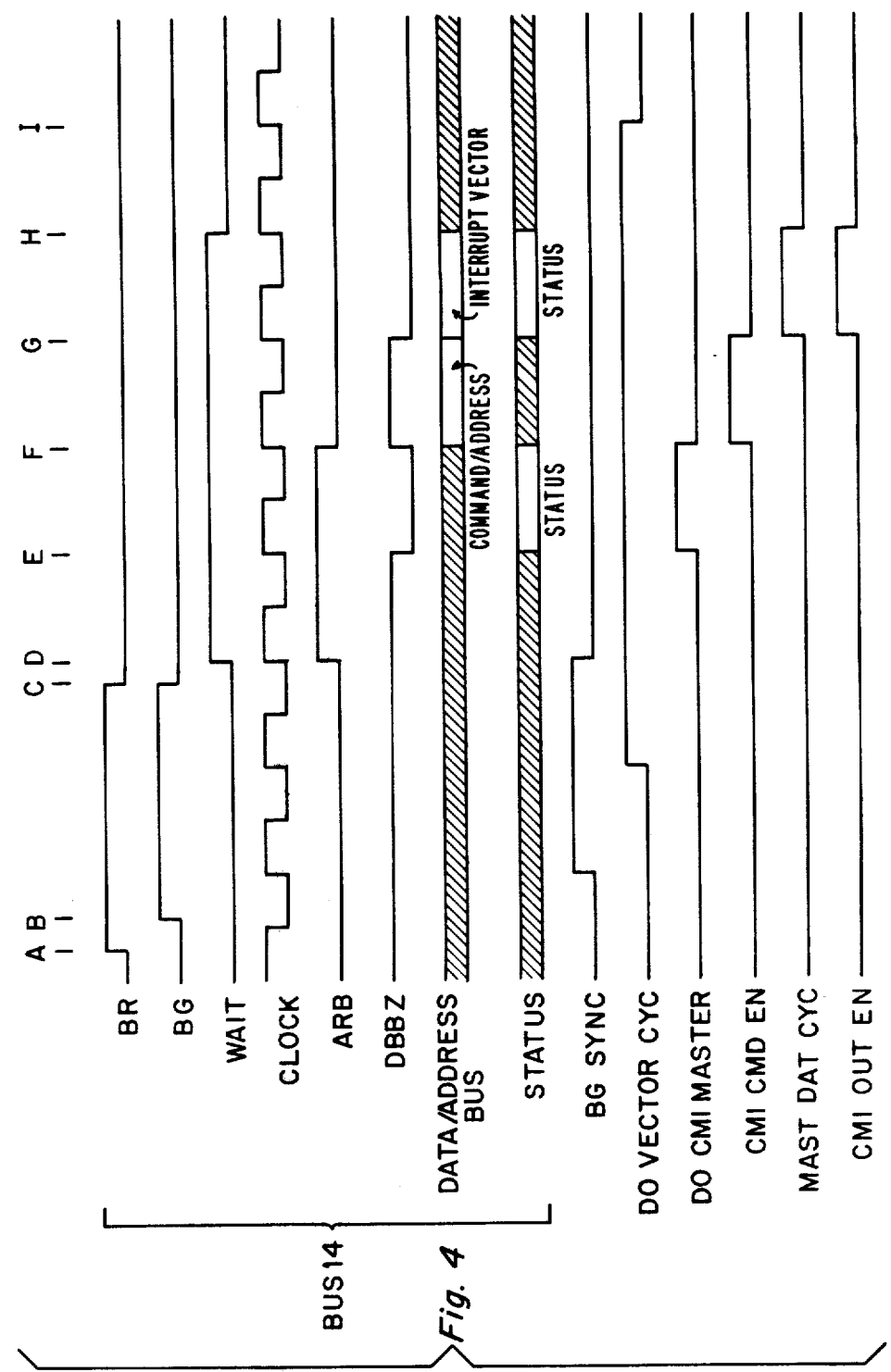
FIG. 4 is a timing diagram showing the relationship of signals on the system bus in connection with requesting an interrupt and transferring the interrupt vector thereover.

FIG. 3 contains a flow diagram depicting the sequence of signals on bus 14 in connection with a WRITE VECTOR transaction, and FIG. 4 contains a timing diagram showing the relationship among the various signals. As an example, it will be assumed that a nexus such as secondary storage bus adapter 26 as shown in FIG. 1 requires interrupt service by central processor unit 10. The secondary storage bus adapter 26 first energizes the BR interrupt request conductor 46 (step 101) to which it is connected, thereby asserting the respective BR interrupt request signal. This is depicted at time A in FIG. 4. When the central processor unit 10 can accept an interrupt, as explained hereinafter, it energizes the BG interrupt grant conductor 47 corresponding to the highest priority BR interrupt request conductor 46 that was energized (step 102, time B in FIG. 4). The secondary storage bus adapter will be assumed to be connected to this BG interrupt grant conductor 47. The secondary storage bus adapter 26 receives the BR interrupt grant signal, and, de-energizes the BR interrupt request conductor (time C in FIG. 4), energizes the WAIT conductor 45 (step 103 time D in FIG. 4), and its conductor of arbitration bus 41.

While the DBBZ data/address bus busy conductor of bus 14 is energized by any nexus connected to bus 14, another nexus is engaged in a bus transaction over bus 14. The assertion of the DBBZ data/address bus busy signal prevents any other nexus from arbitrating on bus 14 to engage in a bus transaction. When the DBBZ conductor is de-energized, secondary storage bus adapter 26 determines if its arbitration conductor has the highest priority of the energized conductors (step 104 time E to F in FIG. 4). If the nexus does not have the highest priority, it keeps its arbitration conductor energized until its conductor does have the highest priority. When the secondary storage bus adapter arbitration conductor does have the highest priority, it de-energizes its arbitration conductor (step 105, time F in FIG. 4), and energizes the DBBZ data/address bus busy conductor to prevent other nexuses from arbitrating. Simultaneously, the secondary storage bus adapter 26 transfers a WRITE VECTOR command and an address identifying the central processor unit 10 over the data/address bus 42. Secondary storage bus adapter 26 then transfers the interrupt vector (step 106, time G in FIG. 4), over data/address bus 42 to central processor unit 10, and simultaneously de-energizes the DBBZ data address bus busy conductor and the processor 10 transfers status information on the STATUS conductors. At time H in FIG. 4 the WRITE VECTOR bus transaction is completed.

FIGS. 5 through 8 depict circuitry contained in secondary storage bus adapter 26 and input/output bus adapter 22 for generating certain signals used by the respective nexuses during the WRITE VECTOR operation.

The circuitry disclosed in FIG. 5 is contained in the secondary storage bus adapter 26 for generating certain signals used to energize the particular BR bus request conductor to which it is connected. If the secondary storage bus adapter 26 requires servicing by the central processor unit 10, an interrupt request signal, for example the ATTN SYNC synchronized attention signal shown in FIG. 5 is asserted, which causes a flip-flop 120 to set when the next MBA CLK clocking signal is asserted. The MBA CLK clocking signal has the same timing as, and is run in synchronism with, the CLOCK clocking signal on CLOCK conductor 47 of bus 14 (FIGS. 2 and 4). The setting of flip-flop 120 causes an ATTN attention signal to be asserted, which in turn energizes an AND gate 121 if a DT BUSY data transfer busy signal is not asserted. The DT BUSY signal is asserted only when the secondary storage bus adapter is in the process of transferring information over bus 14. The secondary storage bus adapter 26 cannot request an interrupt if it is also in the process of transferring information over bus 14. The energization of AND gate 121 in turn energizes OR gate 122, which energizes AND gate 123 if an INT EN interrupt enable signal is asserted. The INT EN interrupt enable is generated by other conventional circuitry (not shown) in secondary storage bus adapter 26 when other conditions in the secondary storage bus adapter 26 are such as to permit it to request an interrupt. When AND gate 123 is energized, a flip-flop 124 is then set at the next MBA CLK clocking signal which, in turn, energizes the BR bus request line to which the secondary storage bus adapter 26 is connected.

Other conditions in secondary storage bus adapter 26 may also require service by the processor, necessitating generation of an interrupt. These conditions result in the assertion of an INTER interrupt signal, which also energizes OR gate 122, and ultimately results in the setting of flip-flop 124 if the INT EN interrupt enable signal is asserted.

With reference to FIG. 6, the determination of whether the central processor unit 10 can be interrupted is determined in part by the processor's interrupt priority level IPL, which is determined by the status of the processor as it is processing an instruction or sequence of instructions. In one specific embodiment, the processor has thirty-two levels of interrupt priority. The particular interrupt priority level at which the processor is then operating is determined by the processor based on the nature of the program sequence and the particular instruction the processor is then executing. The IPL interrupt priority level is stored in a register 150.

Each of the four BR interrupt request conductors 46 is directly related to a particular interrupt priority level. The signals carried on the BR interrupt request conductors 46 are compared to the current IPL interrupt priority level stored in register 150 in a comparator 152. If a BR bus request conductor is energized that has a higher interrupt priority level than the highest IPL interrupt priority level that is then stored in IPL register 150, comparator 152 asserts an INT PNDG interrupt pending signal and a REAL BR IPL signal. The INT PNDG interrupt pending signal informs the central processor unit that an interrupt is pending having an interrupt priority that is greater than the IPL interrupt priority level of the processor. The processor then asserts an ISS BG issue interrupt grant signal. At a next SPH1 clocking signal, which is generated by an internal clock 160 an AND gate 153 is energized to assert an ISS BG & SPH1 signal, which causes flip-flop 155 to be set at the next CLK clocking signal from bus 14. The setting of flip-flop 155 asserts a BUS GRANT & RT signal, which energizes an AND gate 156 when the SPH1 clocking signal is not asserted. Energizing AND gate 156 causes the BG interrupt grant signal to be asserted, which energizes the BG interrupt grant conductor of bus 25 (FIG. 1) that corresponds to the energized BR conductor having the highest priority.

More than one nexus may assert each BR interrupt request conductor and receives an interrupt grant signal over the corresponding BG conductor. The determination of the nexus connected to the BG interrupt grant conductor that is granted the interrupt is determined by position, that is, the proximity of the unit to the processor along the particular BG bus grant conductor. The closer the unit is to the processor along the BG interrupt grant conductor the higher its priority. Thus, the circuitry shown in FIG. 7, which is contained in the secondary storage bus adapter 26 and other nexuses connected to receive the BG interrupt grant signal, receives the BG interrupt grant signal either directly from the central processor unit 10 or indirectly from other nexuses connected to the same BG interrupt request conductor upstream of the secondary storage bus adapter 26. The nexuses transfer the BG interrupt grant to the next nexus on the same BG bus grant conductor if they are not asserting the BR bus request signal.

Figure 7:
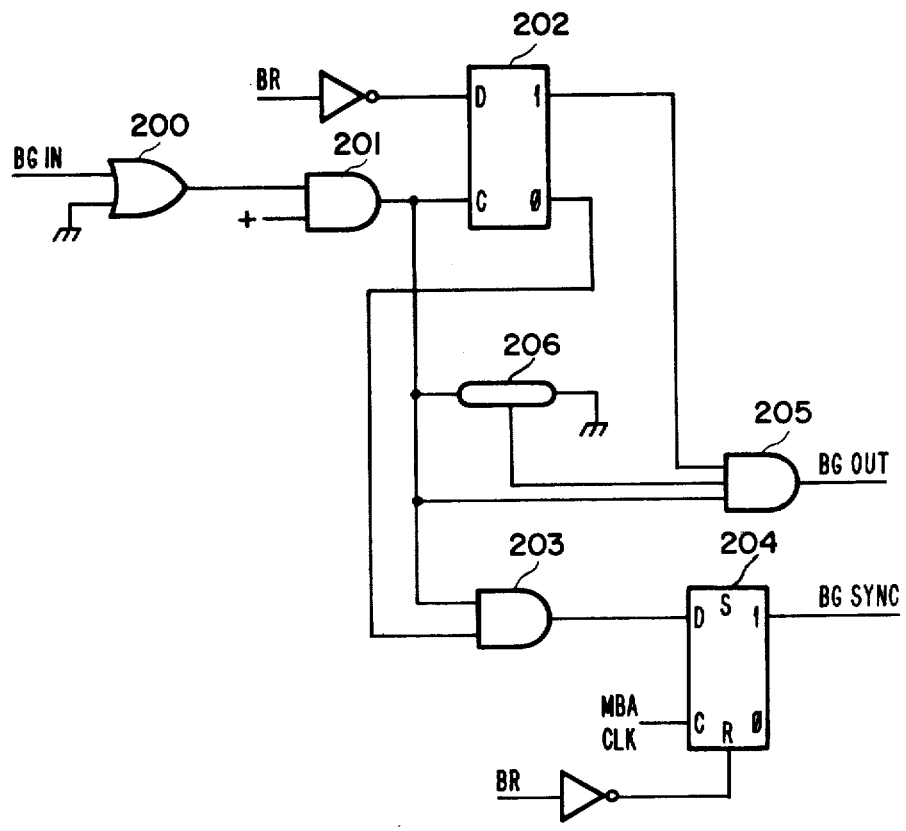
FIG. 7 is a schematic diagram of a circuit according to the invention for receiving the interrupt grant signal.

The circuitry shown in FIG. 7 receives the BG interrupt grant signal as a BG IN signal, which energizes an OR gate 200 and an AND gate 201, to provide a clocking signal for a flip-flop 202. If the nexus is asserting the BR interrupt request signal, flip-flop 202 is not set, and an AND gate 203 is energized by the asserted reset output of flip-flop 202 and the energization of AND gate 201. When the next MBA CLK clocking signal is asserted, a flip-flop 204 is set, which asserts a BG SYNC interrupt grant synchronizing signal, as shown in FIG. 4.

Contrarywise, if the nexus is not asserting the BR bus request signal when the BG IN signal is received, the flip-flop 202 is set. An AND gate 205 is thus energized by the energization of AND gate 201 and the setting of flip-flop 202, after a delay determined by a delay line 206. The energization of AND gate 205 asserts a BG OUT signal, which in turn transfers the BG bus grant signal on conductors 47 (FIG. 2) to the next downstream unit connected thereto on the bus grant line. Flip-flop 204 is reset, to deassert the BG SYNC interrupt grant synchronizing signal, when the BR signal is next deasserted. As has been previously indicated, the BR bus request signal is deasserted when the WAIT signal is asserted on WAIT conductor 45 shown on FIG. 2.

Figure 8:
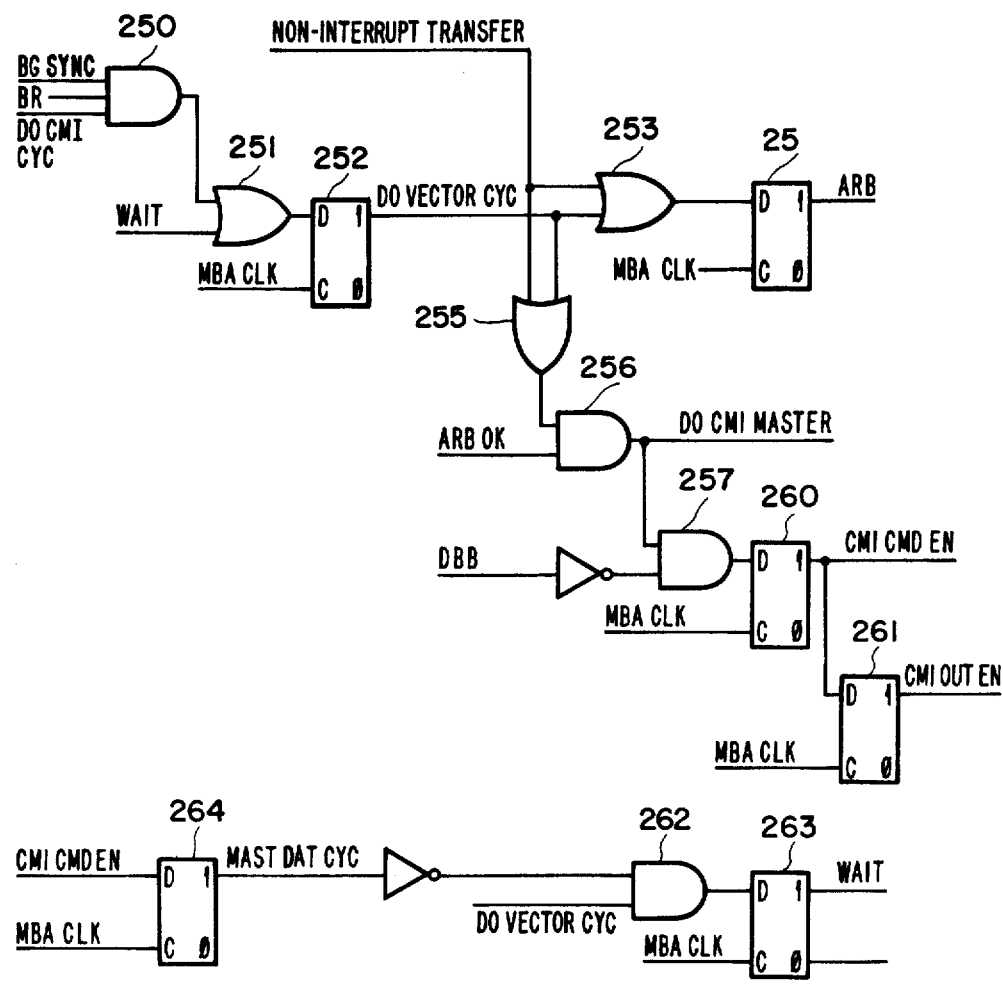
FIG. 8 is a schematic diagram showing circuits according to the invention for generating signals that enable the interrupt vector to be transferred over the system bus, and for energizing certain signal paths of the system bus.

FIG. 8 shows circuitry also contained in secondary storage bus adapter 26, which causes the adapter 26 to energize its arbitration conductor of arbitration bus 41, and to energize the WAIT conductor 45. The circuitry shown in FIG. 8 also causes secondary storage bus adapter 26 to sequentially transfer the WRITE VECTOR command and address and the WRITE VECTOR data interrupt vector as data on the data/address bus 42 of bus 14 as discussed in connection with FIGS. 2 and 4.

With reference also to FIG. 8, when the BG SYNC signal from flip-flop 204 shown on FIG. 7, and the BR signal from FIG. 5 are both asserted, and a DO CMI CYC signal is not asserted, an AND gate 250 is energized. The DO CMI CYC signal is not asserted when secondary storage bus adapter 26 is not attempting to perform another transfer over bus 14. The energization of AND gate 250 also energizes an OR gate 251, which causes a flip-flop 252 to be set when the MBA CLK clocking signal is next asserted. The setting of flip-flop 250 asserts a DO VECTOR CYC signal, as shown in FIG. 4, which causes the secondary storage bus adapter 26 to perform a WRITE VECTOR transaction.

The assertion of the DO VECTOR CYC signal energizes an OR gate 253, which causes a flip-flop 254 to be set by the next MBA CLK clocking signal. The setting of the flip-flop 254 causes the secondary storage bus adapter 26 to energize its arbitration conductor of arbitration bus 41 as shown at time D in FIG. 4. The assertion of DO VECTOR CYC signal also energizes an OR gate 255.

When the secondary storage bus adapter's arbitration line has the highest priority of all those energized during time period E–F in FIG. 4, that is, when the DBBZ data/address bus busy signal is not asserted, other circuitry (not shown), asserts an ARB OK signal. The assertion of the ARB OK signal and energization of OR gate 255, in turn, energizes an AND gate 256, which asserts a DO CMI MASTER signal. The assertion of the DO CMI MASTER signal energizes an AND gate 257 if the DBBZ data address bus busy signal is not asserted, as shown at the period E through F on FIG. 4. The energization of AND gate 256 causes a flip-flop 260 to be set at the next MBA CLK clocking signal, which asserts a CMI CMD EN command enable signal, which is also shown in FIG. 4. The assertion of the CMI CMD EN signal at time F of FIG. 4 causes secondary storage bus adapter 26 to energize the DBBZ data/address bus busy conductor to assert the DBBZ signal, and place the WRITE VECTOR command and address signals on the data/address bus 42 of bus 14. At the next MBA CLK clocking signal, at time G of FIG. 4, a flip-flop 261 is set, which asserts a CMI OUT EN signal. The CMI OUT EN signal enables the secondary storage bus adapter to then place the interrupt vector on the data address bus 42 and receive status information from the central processor unit 10 on status bus 43.

Since the CMI CMD EN command enable signal causes secondary storage bus adapter 26 to assert the DBBZ conductor, the AND gate 257 is de-energized at time G of FIG. 4, which causes flip-flop 260 to be reset at the next MBA CLK clocking signal and de-assert the CMI CMD EN signal. Thus, the CMI CMD EN command enable signal is asserted for only one cycle, for the period F–G in FIG. 4. The flip-flop 261 is reset at the subsequent MBA CLK clocking signal at time H in FIG. 4, which de-asserts the CMI OUT EN enable signal.

The DO VECTOR CYC signal generated by flip-flop 252 also energizes an AND gate 262 if a MAST DAT CYC signal is not asserted. The energization of AND gate 262 in turn sets flip-flop 263 to be set at the next MBA CLK clocking signal. The setting of flip-flop 263 asserts the WAIT signal, which is coupled to WAIT line 45 of bus 14 (FIG. 2). The WAIT signal also energizes OR gate 251, which maintains flip-flop 252 in the set condition after the BR and BG SYNC signals are de-asserted. The CMI CMD EN command enable signal, when asserted by flip-flop 260, causes a flip-flop 264 to be set at the next MBA CLK clocking signal. The setting of flip-flop 264 asserts the MAST DAT CYC signal, which de-energizes AND gate 262. This, in turn, causes flip-flop 263 to be reset at the next MBA CLK clocking signal after MAST DAT CYC signal is asserted. The resetting of flip-flop 263 deasserts the WAIT signal. De-assertion of the WAIT signal at the next MBA CLK clocking signal de-asserts the DO VECTOR CYC signal at time I in FIG. 4. This ends the secondary storage bus adapter's WRITE VECTOR transaction.

The foregoing description is limited to a specific embodiment of this invention. It will be apparent, however, that this invention can be practiced in data processing systems having diverse basic constructions or in systems that use different internal circuitry than is described in the specification and attain some or all of the foregoing objects and advantages of this invention. Therefore it is the object of the appended claims to cover all such modifications and variations which come within the true spirit and scope of this invention.

What is claimed as new and desired to be secured by Letters Patent of the United States is:

1. A data processing system comprising:
(A) System interconnection means including means for transferring interrupt request signals, interrupt grant signals, bus access control signals and information signals;
(B) a processor unit means for processing data in response to instructions, said processor unit means including
  (i) means for establishing an operating priority level for said processing means, and
  (ii) processor interruption arbitration means connected to said interrupt request signal transfer means, and said operating priority level means for interrupting the operation of said processor unit means in response to the receipt of an interrupt request signal having a priority level exceeding the operating priority level of said processor unit means, and for transmitting an interrupt grant signal;
(C) At least one data unit means for controlling a transfer of signals over said system interconnection means, said data unit means including:
  (i) processor interruption means connected to said interrupt request signal transfer means and said interrupt grant signal transfer means for transmitting an interrupt request signal and for receiving an interrupt grant signal;
  (ii) bus access control means connected to said processor interruption means and said bus access control signal transfer means for transmitting and receiving bus access control signals and for controlling the access of said data unit means to said system interconnection means for transfers of information signals in response to the processor interruption means receipt of an interrupt grant signal and to the receipt of bus access control signals; and
  (iii) interrupt vector transmitting means connected to said information transfer means, said bus access control means and said processor interruption means for transferring an interrupt vector over said information transfer means in response to the receipt of an interrupt grant signal and to the data unit means obtaining access to said system interconnection means whereby said data means first receives an interrupt grant signal and then receives access to said system interconnection means for transfers of information signals before transferring an interrupt vector over the information signal transfer means.

2. A data unit means for connection to a system interconnection means in a data processing system that includes a processor unit means for receiving interrupt request signals and transmitting interrupt grant signals, the system interconnection means including interrupt request signal transfer means, interrupt grant signal transfer means, bus access control signal transfer means and information signal transfer means, said data unit means comprising:
  (i) processor interruption means connection to said interrupt request signal transfer means and said interrupt grant signal transfer means for transmitting an interrupt request signal and for receiving an interrupt grant signal;
  (ii) bus access control means connected to said processor interruption means and said bus access control signal transfer means for transmitting and receiving bus access control signals and for controlling the access of said data unit means to said system interconnection means for transfers of information signals in response to the processor interruption means receipt of an interrupt grant signal and to the receipt of bus access control signals; and
  (iii) interrupt vector transmitting means connected to said information transfer means, said bus access control means and said processor interruption means for transferring an interrupt vector over said information transfer means in response to the receipt of an interrupt grant signal and to the data unit means obtaining access to said system interconnection means whereby said data means first receives an interrupt grant signal and then receives access to said system interconnection means for transfers of information signals before transferring an interrupt vector over the information signal transfer means.

3. A data unit means as defined in claim 2 in which said data interrupt grant acknowledgement signal transmitting means is further connected to said interrupt request signal transmitting means and includes a bistable means having a first condition responsive to the coincidence of the transmission of an interrupt request signal and the receipt of an interrupt grant signal for transmitting the interrupt grant acknowledgement signal, and further responsive to said second data terminating transmission of interrupt request signal for terminating transmission of the interrupt grant acknowledgement signal.

4. A data unit means as defined in claim 3 in which said data processing system includes a plurality of data unit means each for connection to the system interconnection means and said access control means includes
   (i) access request means connected to said transfer request signal transfer means and responsive to the coincidence of an interrupt request signal and the receipt of an interrupt grant signal and to an interrupt grant acknowledgement signal for transmitting a bus access control signal onto said bus access control signal transfer means, and
   (ii) means connected to said bus access control means and said access control signal transfer means for receiving at least the access control signal from all the data unit means having a higher priority than said data unit means for enabling said information signal transfer means when said data unit means has the highest priority level.

5. A data unit means as defined in claim 4 wherein said system interconnection means further includes means for transferring a signal indicative of whether a transfer is taking place on said information signal transfer means, and wherein an information transfer includes first signals identifying the direction of transfer and the location with respect to which the transfer is to occur and second signals constituting the information to be transferred, said second data means including means responsive to the coincidence of the transfer indication signal indicating that no transfer is occurring over the information signal transfer means, the enabling of an information transfer by said access control means, and the transmission of an interrupt grant acknowledgement signal for generating a signal enabling the transfer of first signal over the information signal transfer means.

6. A data unit means as defined in claim 5 wherein said information signal transfer means further includes means responsive to the first signal enabling signal for thereafter generating a signal enabling the transfer of said second information signals over the information signal transfer means.

7. A data unit means as defined in claim 5 wherein said interrupt grant acknowledgement signal transmitting means includes means responsive to generation of a first signals transfer enabling signal to terminate transmission of the interrupt grant acknowledgement signal.

8. In a data processing system including a processor means connected to system interconnection means including means for transferring bus access control signals, information signals, interrupt request signals and interrupt grant signals, a data means comprising:
   (a) interrupt request means connected to the interrupt request signal transfer means for transmitting signals requesting an interrupt of the processor over the interrupt request signal transfer means;
   (b) interrupt grant signal receiving means connected to the interrupt grant signal transfer means for receiving an interrupt grant signal indicating that the processor will accept the interrupt,
   (c) bus access control means connected to the bus access control signal transfer means and to said interrupt grant signal receiving means for transferring bus access control signals in response to the receipt of the interrupt grant signal and for controlling the access of the data means to said system interconnection means for transfers of information signals in response to bus access control signals; and
   (d) information transfer means responsive to the receipt of an interrupt grant signal and the data means having access to the system interconnection means for transmitting interrupt information over said information signal transfer means, whereby said data means first receives an interrupt grant signals and then receives access to said system interconnection means for transfers of information signals before transferring interrupt information over the information signal transfer means.

* * * * *